United States Patent [19]

Love

[11] 4,138,837

[45] Feb. 13, 1979

[54] VARIABLE SPEED REVERSIBLE DRIVE FOR A HARVESTING APPARATUS

[75] Inventor: Mahlon L. Love, Osco, Ill.

[73] Assignee: Deere & Company, Moline, Ill.

[21] Appl. No.: 735,378

[22] Filed: Oct. 26, 1976

[51] Int. Cl.$^2$ ............................................. A01D 69/06
[52] U.S. Cl. ........................................ 56/11.2; 74/740
[58] Field of Search ....................... 56/11.2, 11.1, 10.2; 74/740, 674

[56] References Cited

U.S. PATENT DOCUMENTS

| 2,525,481 | 10/1950 | Flora | 56/11.2 |
|---|---|---|---|
| 2,639,569 | 5/1953 | Pasturczak | 56/10.2 |
| 3,138,908 | 6/1964 | Budzich | 56/10.2 |
| 3,145,584 | 8/1964 | Fairbank et al. | 56/11.1 X |
| 3,375,738 | 4/1968 | Love | 74/740 |
| 3,646,834 | 3/1972 | Davis | 74/674 |

*Primary Examiner*—Louis G. Mancene
*Assistant Examiner*—Daniel J. Leach

[57] ABSTRACT

An agricultural crop harvester's feeding and gathering units are driven by a power source on the harvester through a sheave assembly journaled on a countershaft mounted towards the rear of the feeding unit. Power is then transmitted by a variable ratio V-belt drive to a speed reducing and direction reversing planetary gear unit mounted forwardly on the feeding unit and finally to the gathering and feeding mechanisms by drives of conventional design. In the variable ratio V-belt drive, the effective diameter of a split sheave output portion of the countershaft sheave assembly is selectively adjusted hydraulically while, in inverse response, the effective diameter of a spring loaded variable driven split sheave, integral with the planetary gear unit, adjusts automatically. In addition, the driven sheave is provided with a coaxial cam arrangement responsive to changes in torque transmitted so that its effective diameter also adjusts automatically to provide appropriate belt tension. Interposing a speed reducing planetary gear unit in the drive system following the V-belt drive makes possible the use of comparatively higher belt speeds and smaller sheave diameters and facilitates provision of a selectively reversible drive to the gathering and feeding units. The reversed speed of rotation of the output of the planetary unit is substantially lower than its forward speed.

17 Claims, 5 Drawing Figures

VARIABLE SPEED REVERSIBLE DRIVE FOR A HARVESTING APPARATUS

BACKGROUND OF THE INVENTION

This invention relates to mechanical power transmission systems and particularly drive systems on agricultural harvesting machines in which a capability for varying speed and for occasional direction reversal are advantageous, such as in the drive for a header comprising gathering and feeding units.

It is known to mount variable speed V-belt drives on the feeding unit of a header for driving both its gathering and feeding units. A drive of this general type is shown in U.S. Pat. No. 3,759,021 issued to Schreiner et al. and sharing a common assignee with the present application. However, because of demands for higher performance and higher capacity harvesting machines, individual drives are being required to transmit ever higher horsepowers. Considerations of efficiency and the need to limit overall machine size make it desirable to minimize the overall dimensions of such drives and their components.

At the same time, operators and owners of harvesting machines are requiring designs giving more attention to safety and convenience in operation. In difficult crop conditions it is possible to plug even the best of machines but the increasing size and capacity of modern machines are making it less practicable to clear blockages by hand unassisted by any power means. The need for some means of powered reversal of gathering and feeding units has long been known and a few reversing systems have been offered. These have tended to be bulky and relatively expensive single purpose units superimposed on existing drive systems rather than integrated into them. Typically the drive reversing systems offered have been applied only to parts of the feeding or gathering units, rather than to the complete gathering and feeding system and have enjoyed only limited commercial success. To be successful, reversers must be reliable, simple, low cost, compact, convenient to operate and not interfere with or detract from normal operation of the machine.

SUMMARY OF THE INVENTION

Accordingly, a principal object of this invention is to provide a drive system for the gathering and feeding units of a crop harvester that is compact, efficient and economical in relation to horsepower transmitted and which provides an effective, convenient and low cost reversing function.

A feature of the invention is the combination of a variable ratio torque responsive V-belt drive with a planetary gear speed reducer in a drive system mounted on the side of the feeding unit and receiving its input at a countershaft assembly from a power source on the harvester. The speed reducing unit is on the output side of the drive, permitting the use of higher belt speeds and hence more power to be transmitted by the variable ratio V-belt drive with relatively smaller sheaves and belt cross section.

A planetary gear set in itself is a most compact form of speed reducer and when it is combined in one transmission unit with a torque responsive sheave, as in this invention, economies in structure and bearing design are realized which result in a very compact unit. Use of such a compact drive with its high specific horsepower capacity helps to minimize component weight and facilitates closer coupling of the gathering and feeding units and hence helps reduce the lift capacity and stability problems associated with the large forward mounted gathering units which are becoming increasingly common.

Because of wide variations in crop density and feeding rates, drives to gathering and feeding units are subject to very large fluctuations in loading. By using a torque responsive sheave in the speed reducing unit, belt tension is adjusted automatically according to the torque transmitted so that drive efficiency at all loads and belt life are improved, and relatively smaller sheaves and V-belt cross section may be used to transmit a given horsepower. The torque responsive sheave is thus a contributory factor to the compactness of the drive.

Another feature of the invention is that the planetary gear set arrangement facilitates the provision of an optional reverse drive, conversion to which requires only the addition of a single ring gear assembly and a control linkage. This ring gear is maintained in its radial position solely by its engagement of the planetary pinions of the gear set and no additional bearings are required. Thus provision of a reversible drive does not sacrifice space and is done at low cost. A shifting collar, splined to an output shaft, transmits output from the planetary gear set to that shaft, selectively engaging either a sun gear for the reduced speed forward drive or, internally, a hub plate attached to the ring gear for the reversed drive.

It is a feature of the drive that the reverse speed of the output of the gathering and feeding units is considerably reduced over the forward speed so that ample torque is available for clearing blockages by reversing the direction of flow of crop material in the gathering and feeding units and so that clearance of blockages may be effected in a deliberate and controlled fashion. The control for selecting reverse drive is placed at the operator's station so that he may clear blockages from that station, safely remote from the moving parts of the machine.

Another feature of the invention is the provision of an improved sheave and countershaft assembly including a split adjustable driving sheave in which hub portions of the sheave halves are mutually supporting, extending concentrically one over the other in a close fitting telescoping relationship so that only two bearings are needed to stabilize the sheave assembly on its shaft instead of the conventional three, thus providing a compact assembly with respect to length of hub, reducing cost and simplifying assembly.

DESCRIPTION OF THE PREFERRED EMBODIMENT

Figures 1, 2:
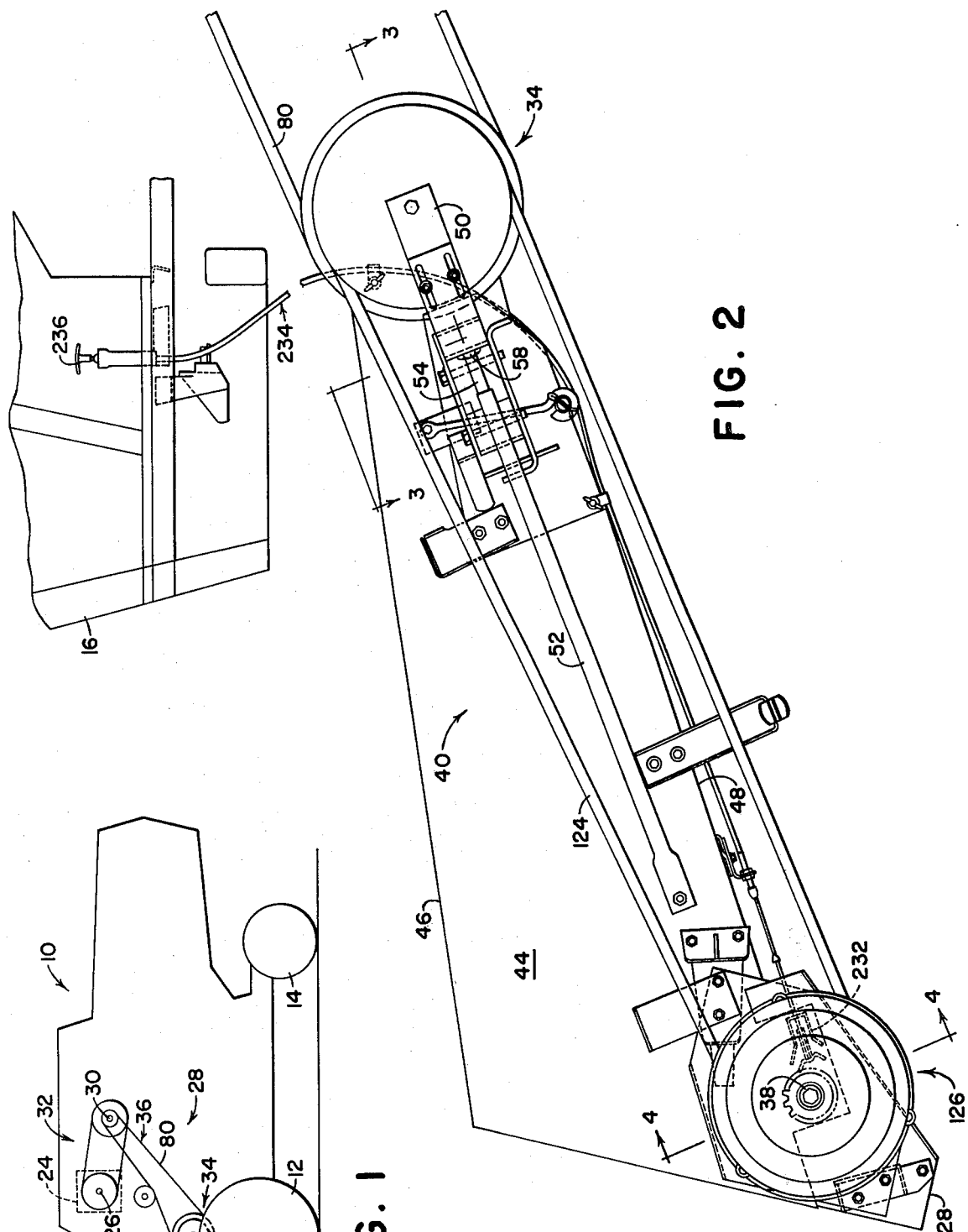
FIG. 1 is a schematic side elevation of a combine embodying the invention.
FIG. 2 is an enlarged semi-schematic partial side elevation of the combine operator station, showing the control cable, and the feeding unit, showing the drive to the gathering and feeding units.

The invention is embodied in a self-propelled combine having a main separator body indicated generally in FIG. 1 by the numeral 10, mounted on a pair of forward drive wheels 12 and steerable rear wheels 14. An elevated operator's station 16 is mounted at the front of the separator body 10. A forward mounted header indicated generally by the numeral 18 is pivoted on a horizontal transverse pivot (not shown) at the front of the separator body 10 for vertical adjustment by conventional means. The header includes a feeding unit indicated generally by the numeral 20 and a gathering unit indicated generally by the numeral 22. A transversely oriented internal combustion engine 24 indicated in schematic outline only in FIG. 1 is mounted towards the front of the separator body 10 and has an output power shaft 26 extending from the left-hand side of the separator body. A belt-type drive system indicated in its entirety by the numeral 28 is disposed on the left side of the combine and transmits power from the engine power shaft 26 to the header 18.

The belt drive system 28 includes a primary countershaft 30 mounted on the combine body 10 and connected to the engine power shaft 26 by a primary countershaft belt drive indicated generally by the numeral 32. A movable countershaft assembly 34 is mounted on the left-hand side of the feeding unit 20 approximately coaxial with the transverse pivot of the header 18 and is connected to the primary countershaft 30 by a header transfer drive indicated generally by the numeral 36. A header drive shaft 38 is mounted transversely beneath the forward end of the feeding unit 20 as shown most clearly in FIG. 2. The header drive shaft 38 is connected to the movable countershaft 30 by a header drive indicated generally by the numeral 40 in FIGS. 1 and 2. Final drives to the feeding unit 20 and the gathering unit 22 are taken from the header drive shaft 38 by conventional means such as the platform drive 42 indicated schematically in FIG. 1.

The feeding unit 20 shown in schematic outline in FIG. 2 includes a pair of opposite upright side walls 44, a top wall 46 and a bottom wall 48.

Figure 3:
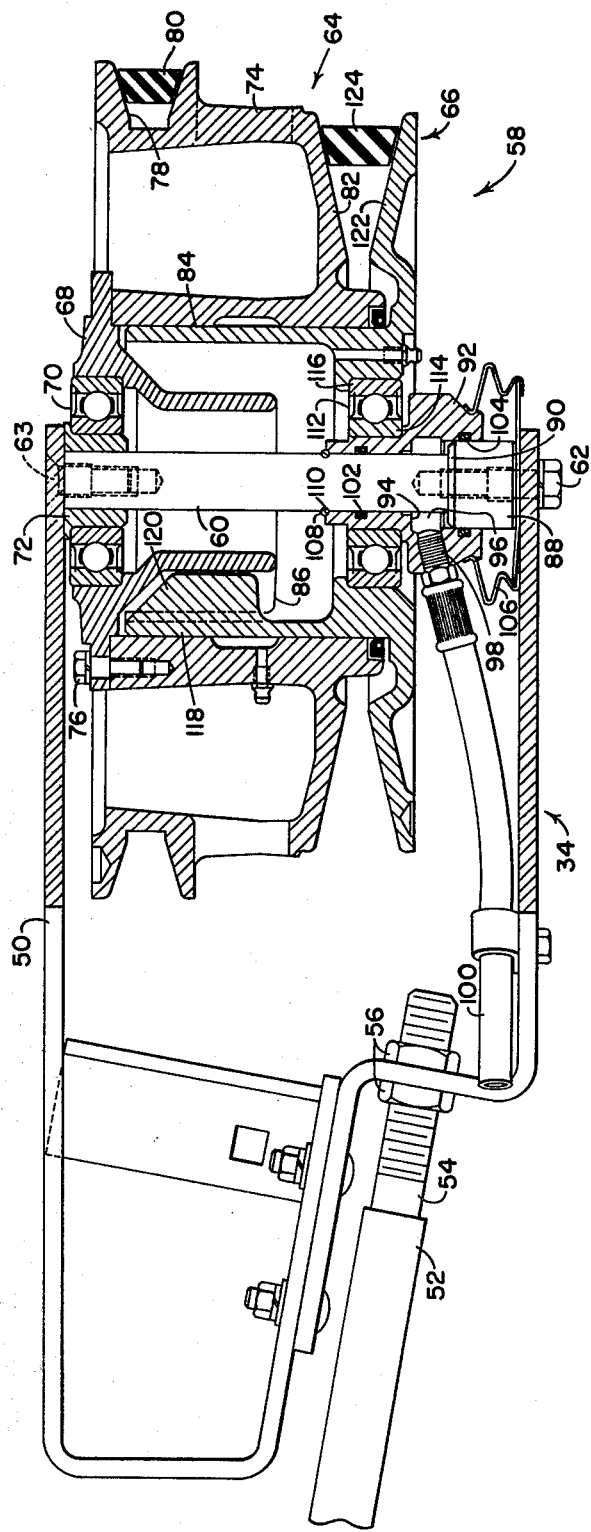
FIG. 3 is a further enlarged partially sectional view on line 3—3 of FIG. 2 of the countershaft assembly showing the hydraulically adjustable drive sheave near its maximum effective diameter setting.

The movable countershaft assembly 34, shown in detail in FIG. 3, includes a frame 50 for mounting it on the left-hand side wall 44 of the feeding unit. A tubular brace 52 extends between the frame 50 and the left-hand side wall 44 and reinforces the mounting of the countershaft assembly 34 on the feeding unit. A threaded insert 54 fixed in the end of the brace 52 and equipped with adjusting nuts 56 engages the frame 50 and in conjunction with slots (not shown) in the mounting between the frame and the side wall 44 provide for adjustment of center distance between the countershaft assembly 34 and the header drive shaft 38. The frame 50 embraces a sheave assembly 58 journaled on the countershaft 60 which is secured in the frame by cap screws 62 and 63.

The sheave assembly 58 includes an axially fixed portion 64 and an axially adjustable portion 66. The fixed sheave portion 64 includes an inner hub 68 journaled by bearing 70 mounted on a shouldered sleeve 72 carried against the frame 50 at the inner end of the countershaft 60. A sheave 74 is concentrically mounted on the inner hub 68 and secured by cap screws 76. The sheave 74 includes a V-belt groove 78 in which rides the V-belt 80 of the header transfer drive 36. Integral with the sheave 74 is a sheave element 82 comprising an inclined face of a conventional V-belt groove. A cylindrical bore 84 in the fixed sheave 74 is concentric with the countershaft 60 and surrounds an axially extending portion of the inner hub 68 which bears a plurality of axially aligned radially extending ribs 86.

An end portion 88 of the countershaft 60 is of increased diameter, and has an inwardly facing radial wall 90. A sleeve 92 with stepped bores closely fitting the shaft 60 and end portion 88 and having an internal radial wall 94 is slidably disposed on the shaft so that a variable chamber 96 is formed, the opposite ends of the chamber being defined by the radial walls 90 and 94 of the shaft and sleeve respectively. An approximately radial threaded hole 98 in the sleeve 92 communicates with the chamber 96. A hydraulic hose 100 threaded into the hole 98 connects the chamber 96 with a source of hydraulic pressure on the combine (not shown). A single-acting hydraulic cylinder is thus constituted with the shaft 60 and its stepped end portion 88 serving as a fixed cylinder rod and piston and the sleeve 92 acting as a moving cylinder. Oil sealing between the sliding parts is effected by annular seals 102 and 104 carried in grooves in the sleeve 92 and a bellows-type seal 106 connected between the end portion 88 of the shaft 60 and the sleeve 92 protects the exposed portion of the "cylinder rod". A snap ring 108 carried in a groove 110 on the shaft 60 limits axial movement of the sleeve 92 in one direction. Engagement between the radial step faces 90 and 94 of the shaft and sleeve respectively limits movement in the opposite direction.

The axially adjustable sheave portion 66 is journaled on the sleeve 92 by a bearing 112 which abuts shoulders 114 and 116 of the sleeve 92 and sheave portion 66 respectively on opposite sides of the bearing. A hollow generally cylindrical hub portion 118 of the sheave portion 66 engages the axially fixed sheave portion 64 closely fitting and extending substantially the full length of the bore 84 for sliding movement therein. Extending generally radially inwards from the hub portion 118 is a plurality of lugs 120 loosely engaging the ribs 86 so as to permit axial movement but prevent any substantial relative rotation between the axially fixed sheave portion 64 and the axially adjustable sheave portion 66. A conventional V-belt groove face 122 integral with the axially adjustable sheave element 66 is concentric with and has an inclination equal and opposite to that of the corresponding V-belt groove face 82 on the fixed sheave portion 64, and together the two faces constitute the groove of a sheave of variable effective diameter. A V-belt 124 of the header drive 40 rides in this groove and transmits power from the movable countershaft assembly 34 to the header drive shaft 38 via a transmission assembly indicated in its entirety by the numeral 126, coaxial with and drivingly engaging the header shaft 38.

Figure 4:
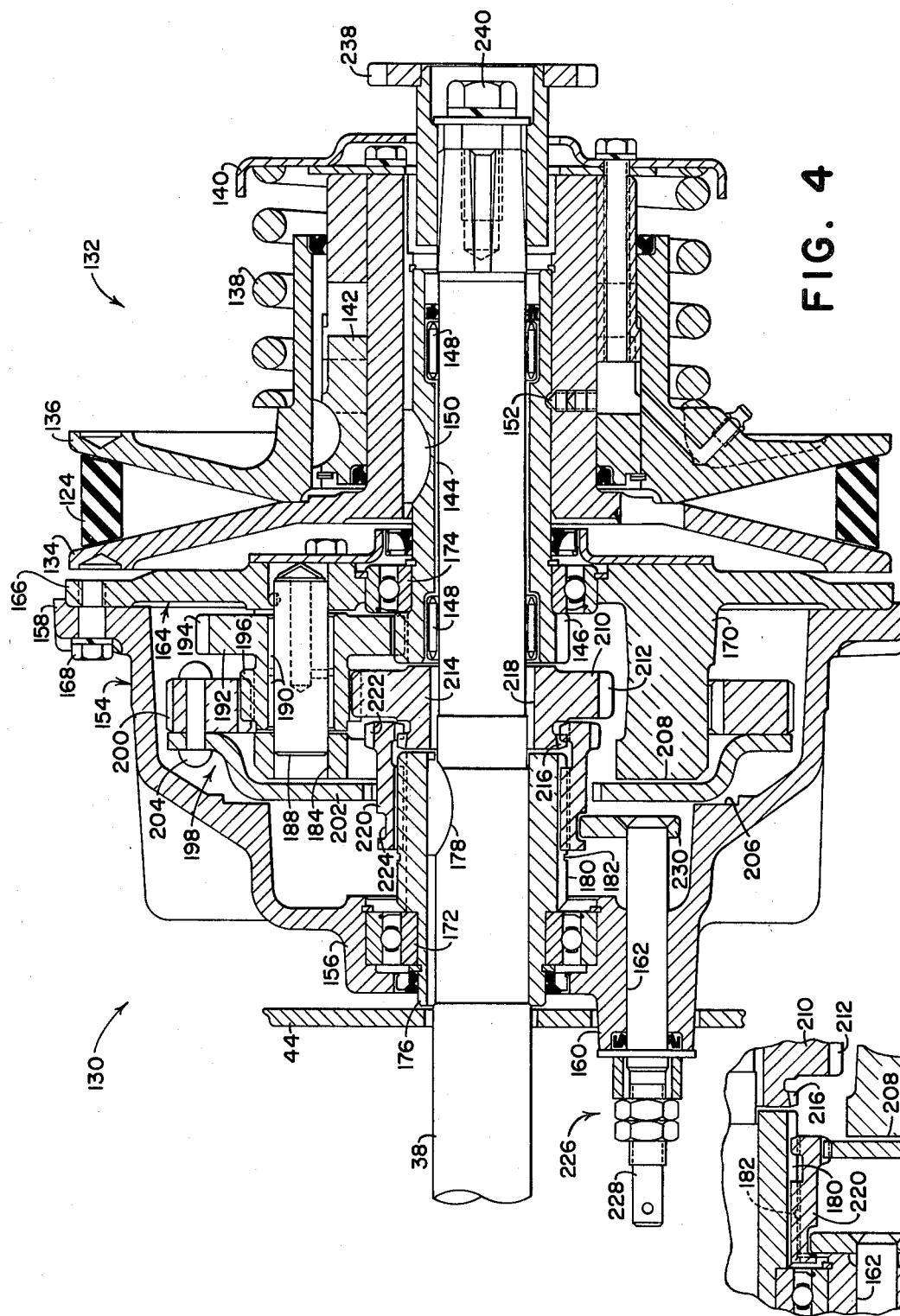
FIG. 4 is a sectional view on line 4—4 of FIG. 2 of the planetary transmission assembly showing the shifting collar engaging the planetary output gear for forward drive and with the torque responsive driven sheave in its maximum effective diameter position.

The transmission assembly 126, best shown in FIG. 4, is mounted on the left-hand side wall 44 of the feeding unit towards its forward end by a bracket assembly 128 shown only in FIG. 2 and disposed so that the header drive shaft 38 lies transversely immediately beneath the bottom wall 48 of the feeding unit. The transmission assembly 126 combines, in an integrated unit, a planetary transmission indicated generally by the numeral 130 and a sheave assembly indicated generally by the numeral 132.

The sheave assembly 132, driven by the V-belt 124, is of the variable effective diameter torque sensing or torque responsive type and includes an axially fixed sheave element 134 and an axially adjustable sheave element 136. A compression spring 138 carried between a spring retainer 140 and the movable sheave element 136 biases that element axially towards the fixed sheave element 134 in the direction of increasing effective diameter. The torque sensing or torque responsiveness of the sheave assembly 132 depends upon control of relative rotation between the two sheave elements 134 and 136 and is effected by a cam assembly 142 annularly contained between them. A torque sensing mechanism of this type is fully described in U.S. Pat. No. 3,881,370 issued to Vogelaar et al. and sharing a common assignee with the present application and will not be described in detail here. Suffice it to say that the cam assembly 142 is so disposed between the sheave elements 134 and 136 that any tendency for relative rotation between the two sheave halves results in a cam action biasing the axially adjustable sheave element 136 toward sheave element 134. The sheave assembly 132 is rotatably carried on the header drive shaft 38 by a hub-like extension 144 of an input sun gear 146 journaled on the shaft 38 by a pair of bearings 148. The sheave assembly 132 is drivably keyed and secured to the input gear hub 144 by a key 150 and set screws 152 respectively.

As previously mentioned, the transmission assembly 126 is mounted on the side wall 44 of the feeding unit 20 by means of the bracket assembly 128. The planetary transmission 130 includes a generally annular bell-shaped gear housing 154 which includes the actual attaching points (not shown) of the transmission assembly 126 to the bracket assembly 128. The inner end of the gear housing 154 includes a bearing housing 156 and the outer end has an annular flange 158. A boss 160 having a bore 162 parallel to the header drive shaft and communicating with the interior of the gear housing 154 extends axially from the rearward side of the gear housing adjacent the bearing housing 156. A pinion carrier 164 closes the bell mouth of the gear housing 154 and includes a cover portion 166 secured to the flange 158 of the gear housing 154 by a plurality of fasteners 168 and, extending axially from the cover portion 166, a pinion carrier structure 170. The gear housing 154 and the pinion carrier 164 together form a gear housing assembly through which the header drive shaft 38 rotatably extends carried by bearings 172 and 174, housed in the bearing housing 156 of the gear housing and in a central bore of the pinion carrier 164 respectively. Annularly interposed between the bearings and the shaft are a shaft hub 176 and the input gear hub 144 respectively. A woodruff key 178 drivingly connects the shaft hub 176 to the shaft. An enlarged diameter portion of the shaft hub 176 extends within the gear housing 154 and includes external splines 180 and a snap ring groove 182 intersecting the splines.

The pinion carrier structure 170 includes a plurality of bores 184 carrying a plurality of pins 188 on which are journaled, by a plurality of bearings 190, pinion gears 192 each including as integral parts a first planetary pinion 194 immediately adjacent the pinion carrier cover and drivably engaging the input sun gear 146 and a second planetary pinion 196 immediately adjacent the first. The second planetary pinions 196 drivably engage and carry a ring gear assembly 198 which includes a ring gear 200 and a concentrically dished clutch plate 202 secured to the ring gear by a plurality of fasteners 204. The ring gear assembly is free to float in the gear housing 154, its movement being limited radially only by the engagement of the ring gear 200 with the second planetary pinions 196 and axially by the confinement of the clutch plate 202 between adjacent faces 206 and 208 of the gear housing 154 and pinion carrier structure 170 respectively. An output sun gear 210 is interposed, concentric with the header drive shaft 38, between the shaft hub 176 and the input sun gear 146 and includes a spur gear portion 212 drivably engaging the second planetary pinions 196 and, immediately adjacent the shaft hub 176, a hub-like extension 214 bearing external splines 216 matching those (180) of the shaft hub 176. The output sun gear 210 has an internal bore 218 exceeding the diameter of adjacent portions of the header drive shaft 38 and is maintained in position radially only by its engagement with the teeth of the second planetary pinions 196 and axially by its close confinement between the shaft hub 176 and the input sun gear 146.

Figure 5:
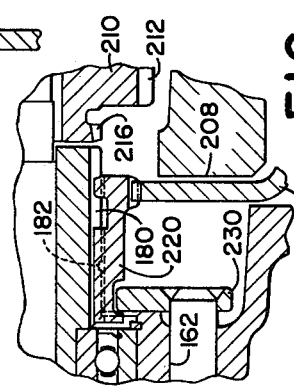
FIG. 5 is a partial view, similar to FIG. 4 showing the shifting collar engaging the ring gear clutch plate for reverse drive.

An internally splined shifting collar 220 is slidably carried on the matching splines of the shaft hub 176 and is axially disposable so that the internal splines selectively also engage (as shown in FIG. 4) or disengage the external splines 216 of the output sun gear 210 so that the shaft hub 176 is selectively coupled to or uncoupled from the output sun gear 210. An increased diameter outer portion of the shifting collar 220 bears an external splined section 222 matching internal splines of the clutch plate 202 and the inner end of the shifting collar has an external annular groove 224. The shifting collar 220 is also disposable axially so that the internal splines of the clutch plate 202 selectively drivably engage (as shown in FIG. 5) or disengage the matching external splines 222 of the shifting collar so that the shaft hub 176 is selectively coupled to or uncoupled from the ring gear assembly 198.

A shifting assembly 226 has a shaft portion 228 slidably disposed in the bore 162 of the boss 160 of the gear housing 154. The shaft 228 extends into the gear housing 154 and carries a shifter plate 230 which engages the external groove 224 of the shifting collar 220. As indicated in FIG. 2, the shifter assembly 226 is connected through a linkage 232 and push-pull control cable assembly indicated generally by the numeral 234 to a control handle 236 at the combine operator's station 16.

As previously stated, the header drive shaft 38 extends transversely beneath the feeding unit 20. Its right-hand end (not shown) extends beyond the right-hand side wall 44 of the feeding unit and is journaled adjacent its end in a bearing supported by the feeding unit 20. Final drives to the feeding and gathering units are taken from the shaft 38 by conventional means including chain or splined couplers, a typical chain coupler half 238 being shown in FIG. 4, retained on the header drive shaft 38 by cap screw 240. A header drive arrangement, using splined couplers in the header drive shaft is disclosed in U.S. Pat. No. Re 26,512 issued to Rohweder and sharing a common assignee with the present application.

In typical harvesting operation the engine 24 is run at a constant speed and hence the sheave assembly 58 of the movable countershaft assembly 34 driven by the engine through the fixed ratio primary countershaft and header transfer belt drives 32 and 36 respectively, also rotates at a constant speed. The gathering and feeding units are driven from the sheave assembly 58 by the V-belt 124 running in the adjustable width V-belt groove formed by the axially fixed sheave element 64 and the axially adjustable element 66. The combine operator selectively adjusts the width of the groove so as to vary the linear speed of the belt 124 and hence the operating speeds of the gathering and feeding units according to crop conditions. To increase operating speed, the operator manipulates a hydraulic control (not shown) to admit oil under pressure to hydraulic cylinder chamber 96. Shaft 60 and sleeve 92 behave as a single acting hydraulic cylinder with the rod remaining stationary while the body (sleeve 92) carrying the movable sheave element 66 is biased towards the fixed sheave element 64 in the direction of increasing effective diameter, effectively reducing groove width and forcing the belt 124 outwards so as to increase belt speed. When the hydraulic pressure is released, belt tension pulls the belt radially inwards so as to force the sheave sections apart expelling hydraulic oil from the chamber 96 and reducing the effective diameter of the sheave so as to reduce belt speed. It will be noted that the close fitting telescoping engagement of the hub portion 118 of the movable sheave half 66 with the bore 84 of the axially fixed sheave portion 64 is of such axial extent in relation to hub diameter that the two sheave portions are mutually supporting with regard to radial alignment so that two axially separated bearings, 70 and 112, rather than the conventional three bearings, are sufficient to support the countershaft sheave assembly 58 stably on the countershaft 60.

The transmission assembly 126 is thus driven at variable speed by the V-belt 124 engaging the groove formed between the axially fixed sheave element 134 and the axially movable sheave element 136. In operation, the center distance between the countershaft assembly 34 and the transmission assembly 126 is fixed and, V-belt 124 being relatively inelastic, changes in the effective diameter of the selectively adjusted drive sheave of the countershaft assembly 34 must result in approximately equal and opposite changes in the effective diameter of the driven sheave 132 of the transmission assembly 126. In the latter, the compression spring 138 biases the movable sheave element 136 towards the fixed sheave element 134 in the direction of increasing effective diameter. However, when the chamber 96 of the hydraulic actuator is pressurized, forcing the belt 124 to run at a greater effective diameter at the countershaft, the spring 138 is overcome forcing the sheave halves apart and allowing the belt to seek a smaller effective diameter on the driven sheave, thus increasing its speed.

Basic belt tension is set before going to the field by loosening the fasteners (not shown) securing the movable countershaft assembly 34 to the side 44 of the feeding unit and adjusting the center distance between the sheaves by means of the nuts 56 on the threaded portion 54 of brace 52. Under heavy load operating conditions an increase of belt tension is desirable and this is achieved automatically through the action of the torque responsive cam assembly 142. If, when the gathering and feeding units are heavily loaded, belt 124 tends to slip, the slipping will result in relative rotational motion between the sheave elements 134 and 136 such that cam action will bias sheave element 136 towards sheave element 134 so as to increase the effective diameter of the driven sheave and hence increase belt tension.

Input to the planetary transmission 130 is through the input sun gear 146 which is keyed to the driven sheave assembly 132, gear and sheave assembly being journaled as a unit on header drive shaft 38. For normal (forward) harvesting operation, the operator, by means of operating handle 236, moves the shifting collar 220 to the position shown in FIG. 4, which drivingly connects the output sun gear 210 with the header drive shaft 38 so that the shaft is driven through the planetary pinion 192 and output gear 210 at a speed considerably slower than that of the sheave assembly 132, a preferred speed reduction ratio being between 2½ and 3:1.

To drive the gathering and feeding units in the reverse direction, for example to clear a blockage, the operator moves the shifting collar 220 to the position shown in FIG. 5 whence the ring gear assembly 198 is drivingly connected to the header drive shaft 38. Drive is now transmitted from the input sun gear 146 through the planetary pinion 192 and the ring gear 198 so that shaft 38 is driven in a reverse direction, a preferred gear ratio being such that reverse speed is approximately half of normal forward or harvesting speed.

If desired, the reversing capability may be made optional. If the planetary transmission is to be used for forward, speed reducing drive only the ring gear assembly 198 and shifting collar controls are omitted and a snap ring is fitted in groove 182 of the shaft hub 176 so as to hold the shifting collar 220 in the position shown in FIG. 4.

I claim:

1. In a header for a mobile harvesting machine, the header including gathering and feeding units and a power input shaft, the harvesting machine carrying a power source, an improved drive for the header comprising:

a drive sheave connected to and driven by the power source;

a driven sheave, coaxial with and driving the input shaft, including a first sheave half, a second sheave half coaxial with and axially shiftable relative to the first sheave half and cooperating with it so as to define a variable effective diameter V-belt groove, at least one of the sheave halves being rotationally deflectible relative to the input shaft, and automatic means coaxial with the driven sheave for axially biasing the second sheave half towards the first sheave half for adjusting the effective diameter in response to rotational deflection between the driven sheave and the input shaft caused by changes in the torque transmitted through the input shaft to the header; and a V-belt trained around the drive and driven sheaves, engaging the driven sheave at its effective diameter, for transmitting power from the drive sheave to the driven sheave, the automatic adjustment of the driven sheave serving to maintain appropriate tension in the V-belt.

2. In a mobile harvesting machine having a crop gathering unit, a crop processing unit, a feeding unit for transferring the gathered crop to the processing unit, and a power source on the harvester for driving the units, the combination therewith of an improved drive system for the gathering unit, carried on the feeding unit, and comprising:

a drive sheave having an adjustable effective diameter, drivingly connected to the power source;

a driven sheave;

a drive belt drivingly trained around said drive and driven sheaves;

transmission means having an input drivingly connected to the driven sheave and an output drivingly connected to the gathering unit and including a drive element selectively shiftable between a forward position and a reverse position so that, for a given driving direction of the input, the driven direction of the output is reversed and the gathering unit is driven in forward and reverse directions respectively;

first control means for shifting the drive element of the transmission between its forward and reverse positions; and second control means for selectively changing the effective diameter of the drive sheave so as to change the speed ratio between the drive and driven sheaves and hence the driven speed of the gathering unit.

3. The invention defined in claim 2 wherein the output of the transmission is also drivingly connected to the feeding unit.

4. In a mobile harvesting machine having a crop gathering unit, a crop processing unit, a feeding unit for transferring the gathered crop to the processing unit and a power source, an improved drive system for driving said gathering and feeding units comprising:

a countershaft carried on the machine;

a rotatable input unit journaled on the countershaft, drivingly connected to the power source and including a drive sheave having a V groove;

a transmission unit mounted on the machine including a torque responsive driven sheave having an adjustable V groove and automatic means for adjusting the effective diameter of the groove in response to changes in torque transmitted by the sheave, an output shaft drivingly connected to the gathering and feeding unit, a speed reducing planetary gear set drivingly connected with the driven sheave and means for drivingly connecting the planetary gear set with the output shaft; and a V-belt engaging the V grooves of the drive and driven sheaves and drivingly connecting the input unit with the transmission unit.

5. The invention defined in claim 4 wherein the drive sheave has an axially fixed first sheave half and an axially adjustable second sheave half, selectively adjustable so as to change the effective diameter of the drive sheave and vary the driven speed of the gathering and feeding units.

6. The invention defined in claim 5 wherein the input unit is journaled on the countershaft by no more than two bearings and wherein the drive sheave halves each have a hollow extended hub, each hub containing no more than one of said bearings, one hub closely fitting and concentrically and telescopingly engaging the other for adjustable axial movement therebetween, the axial engagement and closeness of fit being at least sufficient to align the sheave halves radially and concentrically in a normal working relationship with each other so that bearing support between the sheave and the shaft at only two axially separated points is sufficient to stablize the sheave on the countershaft.

7. The invention defined in claim 4 wherein the planetary gear set and the driven sheave are coaxial with the output shaft and the planetary gear set is immediately adjacent and directly engages the driven sheave in the transmission unit.

8. The invention defined in claim 7 wherein the planetary gear set includes at least two output elements driven in mutually opposite directions and the means for connecting the planetary gear set with the output shaft includes a clutch, selectively engageable with the respective output elements, so that the output shaft may be driven selectively in a forward or a reverse direction.

9. The invention defined in claim 8 wherein the automatic means for adjusting the effective diameter of the driven sheave is effective when the output shaft is driven in both forward and reverse directions.

10. The invention defined in claim 8 wherein the planetary gear set includes a sun gear, at least two planet pinions engaging the sun gear, a ring gear drivingly and concentrically engaging the planet pinions and free to float radially, being maintained in its concentric position only through engagement with the planet pinions, and a drive plate carried by the ring gear, the sun gear and drive plate constituting two of said output elements, and wherein the clutch is operable to selectively engage the sun gear or the drive plate for forward and reverse rotation of the output shaft.

11. The invention defined in claim 10 wherein the planetary gear set reduces the speed of rotation of the output shaft in relation to the speed of the driven sheave in both forward and reverse directions.

12. The invention defined in claim 11 wherein the ratio of the forward speed of the output shaft to the reverse speed of said shaft is between about one-to-one and two-to-one.

13. In a drive system for the feeding unit of a mobile harvesting machine of the type in which the feeding unit has an inlet in a crop receiving relationship with a gathering unit and an outlet in a crop discharge relationship with a crop processing unit the improvement comprising in combination:

reversible drive means operatively connected to the feeding unit for selectively driving the unit in a forward direction, wherein crop material is conveyed from the inlet to the outlet, and in the reverse direction.

14. The invention defined in claim 13 wherein the reversible drive means includes a planetary gear unit having first and second output elements and a shiftable control element operatively associated with the planetary gear unit for selectively connecting the first and second output elements with the feeding unit, said elements driving the feeding unit in forward and reverse directions respectively.

15. In a mobile harvesting machine of the type in which crop material is conveyed by a feeding unit from a gathering unit to a crop processing unit, a transmission for driving the gathering unit carried by the feeding unit and driven by a power source on the machine and comprising:

a transverse shaft drivingly connected to the gathering unit; and a planetary gear assembly including an input element connected to and driven by the power source, first and second output elements, means drivingly connecting the output elements to the input element for rotating the respective output elements in opposite directions, and a control means for selectively engaging said output elements with the transverse shaft for forward and reverse drive of the gathering unit respectively.

16. The invention defined in claim 15 wherein the planetary gear unit is coaxial with the transverse shaft.

17. The invention defined in claim 15 wherein the transverse shaft extends through the planetary gear unit and has opposite sections, one on each side of the planetary gear unit, and the gathering unit includes two portions, each portion being driven individually by an opposite section of the shaft.

* * * * *